United States Patent
Yang

(10) Patent No.: US 8,169,417 B2
(45) Date of Patent: May 1, 2012

(54) SIGNAL TRANSFER ASSEMBLY OF TOUCH PANEL

(75) Inventor: Kai-Ti Yang, Taipei (TW)

(73) Assignee: Young Fast Optoelectronics Co., Taoyung, Taipei (TW)

(*) Notice: Subject to any disclaimer, the term of this patent is extended or adjusted under 35 U.S.C. 154(b) by 1096 days.

(21) Appl. No.: 12/017,062

(22) Filed: Jan. 21, 2008

(65) Prior Publication Data
US 2009/0184931 A1  Jul. 23, 2009

(51) Int. Cl.
*G06F 3/045* (2006.01)
(52) U.S. Cl. .......... 345/174; 178/18.05; 178/18.06
(58) Field of Classification Search .......... 345/173–183; 178/18.01–18.09, 19.01–19.06, 20.01–20.04
See application file for complete search history.

(56) References Cited

U.S. PATENT DOCUMENTS

| | | | | |
|---|---|---|---|---|
| 4,797,514 A | * | 1/1989 | Talmage et al. | 178/18.05 |
| 7,148,881 B2 | * | 12/2006 | Lee et al. | 345/173 |
| 2003/0132920 A1 | * | 7/2003 | Lee et al. | 345/173 |
| 2009/0205879 A1 | * | 8/2009 | Halsey, IV et al. | 178/18.06 |
| 2009/0322705 A1 | * | 12/2009 | Halsey, IV | 345/174 |

* cited by examiner

*Primary Examiner* — Vijay Shankar

(57) ABSTRACT

A signal transfer assembly of a touch panel has a conductive film arranged on a surface of a substrate; an edge of the conductive film being connected to a silver conductive circuit; signals triggered on the conductive film being transferred to the silver conductive circuit and then to the signal output ends at two sides of the silver conductive circuit; an edge of the conductive film having a plurality of resistors near the silver conductive circuit; an area between two slots being formed as a transfer channel so that the resistors and the transfer channels are alternatively arranged. The resistors are hollowed slots penetrating through the conductive film. Each resistor has an oblong shape and lengths of the resistors are longer at a middle portion and are shorter at two sides. Widths of the transfer channels are wider at a middle section and are narrower at two sides.

1 Claim, 3 Drawing Sheets

SIGNAL TRANSFER ASSEMBLY OF TOUCH PANEL

FIELD OF THE INVENTION

The present invention relates to touch panels, and particularly to a signal transfer assembly of a touch panel which can compensate signals due to the decay in the transformation path of the signal so that the signals from various positions of the touch panel have output signals matching to a required specification.

BACKGROUND OF THE INVENTION

Currently, touch panels are well known input devices, which are widely arranged in liquid crystal displays or cathode ray tubes or other displays so that users can input signals by touching the screens of the displays. The touch panel generally has two conductive films which are separated with a gap. At least one conductive film is installed to a flexible transparent film and another conductive film is installed to a surface of a hard substrate. A plurality of plane adhesive strips are installed between the two conductive films. Adhesive areas are left for being coated with glue for combining the two conductive films.

The surface of the conductive film has a conductive layer deposited with conductive material, such as indium tin oxide (ITO) and the signals of the conductive film 1 are electrically connected to the silver-containing conductive electrode at the lateral sides of the conductive film. For example referring to FIG. 3, the conductive film T has a first portion P1. A signal is triggered from P1. The signal is transferred to the silver-containing conductive electrode R through a shortest first path D1 and then the signal is transferred to an M end of the silver-containing conductive electrode from the first signal input point K1 and then is transferred out. Similarly, the signal triggered from a second portion P2 of the conductive film 1 is transferred to the silver-containing conductive electrode from a shortest second path D2 and then is transferred to the M end of the silver-containing conductive electrode from the second signal input point K2 and then is transferred out. Thus from above description, it is known that the signals triggered on the conductive film are transferred to the succeeding signal processing circuit from different transfer paths. However since the general silver-containing conductive electrode is a long plane thin stripe which is arranged on a lateral edge of the conductive film and the silver-containing conductive electrode has a higher impedance. In the process of transferring the impedance signal, the signal will decay. Therefore, the signals will decay in transformation. When the signals transfer from points K1, K2 to M, the signals suffer from different impedances and then the decays of the signals are different. Especially, the impedances of signals are different from the farthest portion Kx to the point M and from the shortest portion Ky to the point M. This difference will affect the positioning on the touch panel and thus will affect the proceeding signal processing. Thus a compensation and calibration process is added so as to have signals matching the requirement.

In many prior art calibration methods, complicated conductive patterns are used to re-distribute the signals or a signal compensation circuit is further added to the silver-containing conductive electrode to control the re-distribute signals and thus to reduce non-uniform signal decays in the transformation of the signals. In U.S. Pat. Nos. 4,293,734, and 4,661,655, the compensation circuits are disclosed. As shown in FIGS. 4 and 5, complicated conductive pattern electrodes are installed at an edge of the conductive film T, which is specially designed. The electrodes have different shapes or lengths and a plurality of electrodes are installed near a middle section so as to reduce the decay in signal transformation and thus the voltage difference between two ends of the electrodes and the center portion thereof. However it is difficult to design the complicated pattern circuit and thus the calibration of the signal is not so precise. Moreover, errors are generated in the manufacturing process and thus imprecise signal calibration occurs. Furthermore, the pattern circuit causes that the area of the touch panel reduce. Besides, in other method of signal calibration, non-parallel curved lines are installed at edges of the conductive film T as a bus-bar R, such as those illustrated in FIG. 6. By this kind of bowed equipotential field bow bar, the signal is calibrated. This prior art is simple, but the bow bar will make the signal output end narrows and thus signal is greatly decayed. Furthermore, the curved edge of the bow bar will make the appearance of the touch panel unbeautiful and the working area of the touch panel is reduced.

SUMMARY OF THE INVENTION

Accordingly, the object of the present invention is to provide a signal transfer assembly of a touch panel, wherein the signals on the touch panel transferred to a silver-containing conductive electrode and then to the signal output ends at two sides of the silver-containing conductive electrode have almost identical impedances so that the strengths of the signals are almost identical in the signal processing unit.

A signal transfer assembly of a touch panel having a conductive film arranged on a surface of a substrate; an edge of the conductive film being connected to a silver conductive circuit; signals triggered on the conductive film being transferred to the silver conductive circuit and then to the signal output ends at two sides of the silver conductive circuit to the succeeding processing circuit; an edge of the conductive film having a plurality of resistors near the silver conductive circuit; an area between two slots being formed as a transfer channel so that the resistors and the transfer channels are alternatively arranged. The impedances of the conductive film and the silver-containing conductive electrode are different. The impedance in the transfer of the signal is approximately positive proportional to an area of the cross section in the transfer path of the signal and is approximately inversely proportional to a traveling length of the transfer path. In above structure, by controlling a length of the hollowed slot and a width of the transfer channel, the signals triggered on the conductive film transferring to the signal output ends at two sides of the silver-containing conductive electrode have different impedances so that the signals have approximately identical voltage as they are transferred to the signal output ends.

The resistors are hollowed slots penetrating through the conductive film. Each resistor has an oblong shape and lengths of the resistors are longer at a middle portion and are shorter at two sides. Widths of the transfer channels are wider at a middle section and are narrower at two sides.

The various objects and advantages of the present invention will be more readily understood from the following detailed description when read in conjunction with the appended drawing.

DETAILED DESCRIPTION OF THE INVENTION

Figure 2:
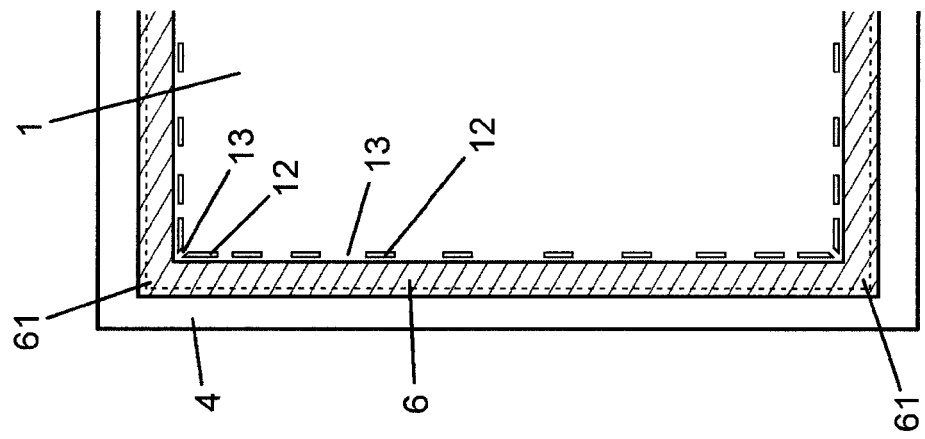
FIG. 2 is a partial plane view of the present invention showing the arrangement of the transfer channels according to the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Referring to drawings, the conductive film 1 of a touch panel is arranged on a surface of a substrate 4. An edge of the conductive film 1 is connected to a silver conductive circuit 6. Signals triggered on the conductive film 1 are transferred to the silver conductive circuit 6 and then to the signal output ends 61 at two sides of the silver conductive circuit 6 to the succeeding processing circuit. An edge of the conductive film 1 has a plurality of hollowed slots 12 near the silver conductive circuit 6. An area between two slots 12 is formed as a transfer channel 13 so that the hollowed slots 12 and the transfer channels 13 are alternatively arranged. A conductive layer of the conductive film 1 is formed by depositing indium tin oxide (ITO). Thus the hollowed slots 12 can be formed by etching. In etching, a coating material for preventing erosion is coated (or printed) upon a desired surface of the conductive film 1 to be retained. Then conductive film 1 is placed into the etching liquid, such as hydrochloric acid or nitric acid. Then the undesired portion of the conductive film 1 is removed by etching, only the desired portion is retained.

As we know, the impedances of the conductive film 1 and the silver-containing conductive electrode 6 are different. The impedance in the transfer of the signal is approximately positive proportional to an area of the cross section in the transfer path of the signal and is approximately inversely proportional to a traveling length of the transfer path. In above structure, by controlling a length of the hollowed slot 12 and a width of the transfer channel 13, the signals triggered on the conductive film 1 transferring to the signal output ends 61 at two sides of the silver-containing conductive electrode 6 have different impedances so that the signals have approximately identical voltage as they are transferred to the signal output ends 61. This is advantageous to the following operations in the signal processing circuit.

Figure 1:
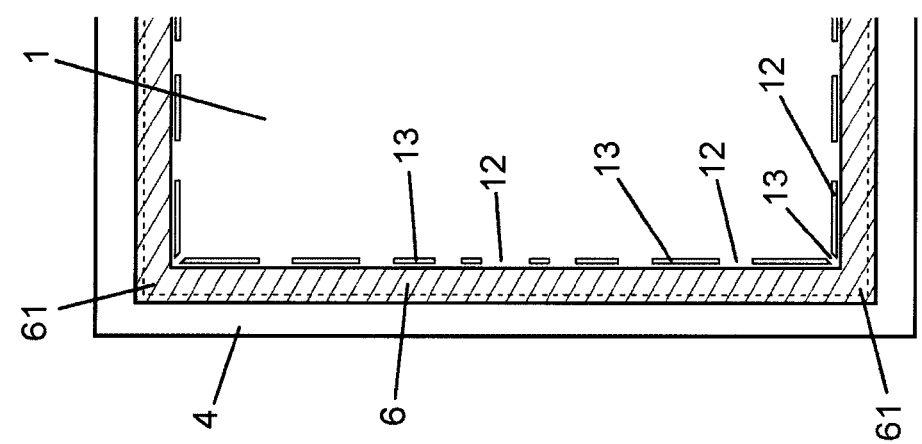
FIG. 1 is a partial plane view of the present invention showing the arrangement of the hollowed slots according to the present invention.
Figure 4:
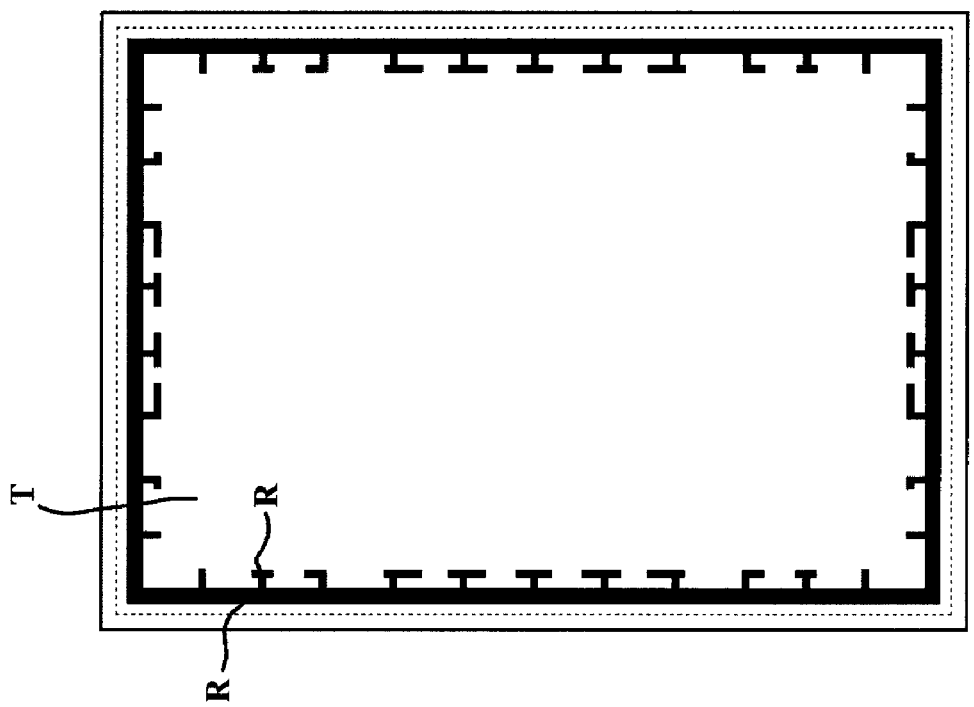
FIG. 4 is a plane view of another prior art touch panel showing that special designed electrodes are arranged at edges of a conductive film.
Figure 3:
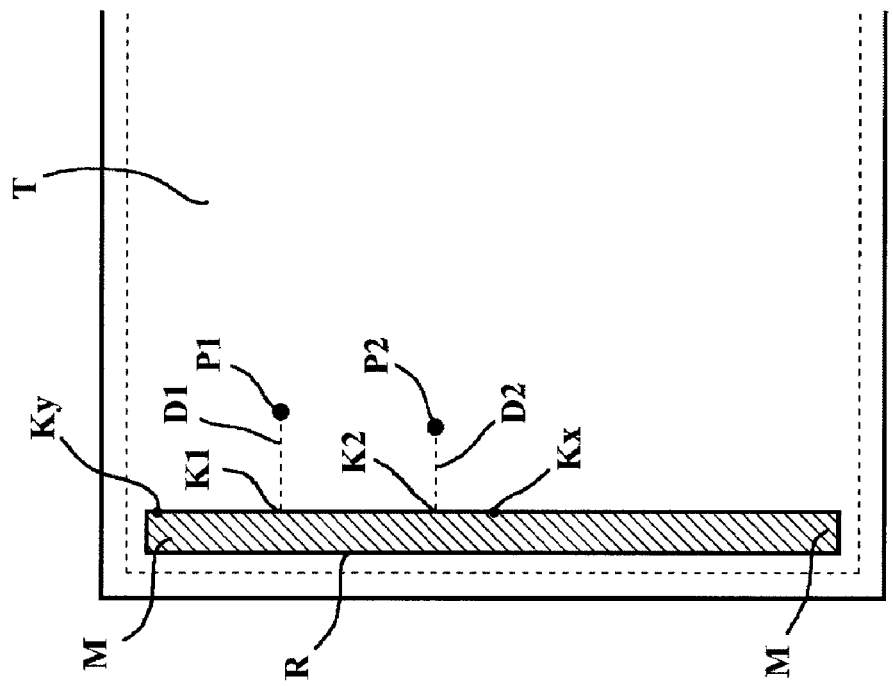
FIG. 3 is a plane view showing a prior art touch panel showing the signals triggered on the conductive film are transferred through different transfer paths.
Figure 6:
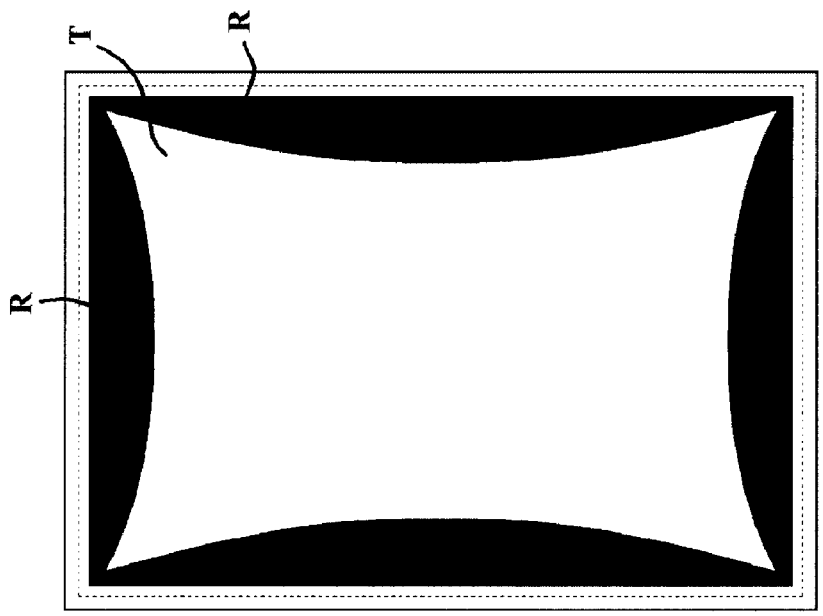
FIG. 6 is a plane view of a conductive film of a prior art touch panel, showing a non-parallel curved conductive bus is installed at edges of a conductive film.
Figure 5:
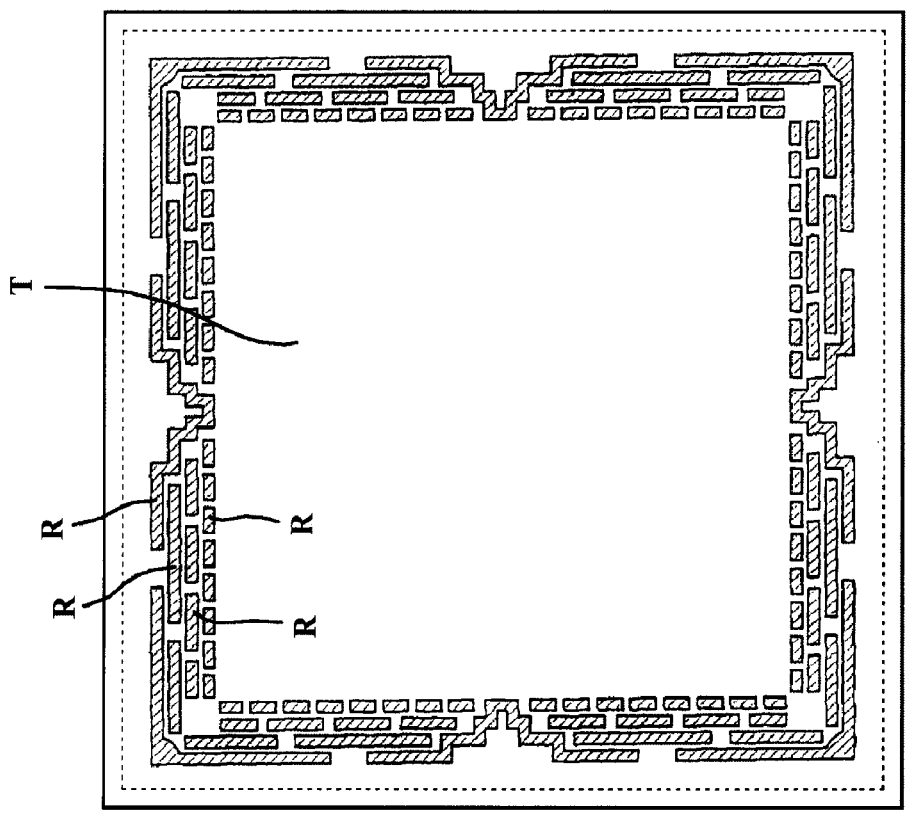
FIG. 5 is a plane view showing the prior art conductive film of the touch panel, showing that specially designed electrodes are arranged at edges of another conductive film.

Referring to FIG. 1, in the transfer structure of the touch panel, the lengths of the hollowed slots 12 are controlled. The lengths of the hollowed slots 12 are increased from the center portion to two sides gradually. Therefore, in the central portion, the lengths of the hollowed slots 12 are shorter and the distribution of transfer channels 13 is dense. Referring to FIG. 2, the signal transfer structure is controlled by controlling widths of the transfer channels 13. The widths of the transfer channels 13 are reduced from the central portion to the two sides with a nonlinear rate. Therefore, the widths in the central portion are wider and the widths of the transfer channels 13 are smaller at two sides. By this arrangement, the signals triggered on the central portion of the conductive film 1 are transferred to the silver-containing conductive electrode 6 with smaller impedances. The signals triggered at two sides of the conductive film 1 are transferred to the silver-containing conductive electrode 6 with larger impedances. The signals received at the central portion of the silver-containing conductive electrode 6 have greater strength and signals received at two sides of the silver-containing conductive electrode 6 have smaller strength, but the signals at the central portion experiences a greater decay as they are transferred to the signal output ends 61 at two sides due to a greater impedance, while the signals received at two sides experiences smaller decays as they are transferred to the signal output ends 61 due to a small impedance. As a result, the signal strengths of the signals from the central portion and signals from the two sides are almost identical.

In summary, due to the alternative arrangement of the slots 12 and the channels 13, the strengths from the central portion and from two sides are almost identical despite of the input points from the conductive film 1 to the silver-containing conductive electrode 6. This is because the differences of the impedances from the arrangement of the hollowed slots 12 and transfer channels 13 will compensate the path differences in the traveling of the signals.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A signal transfer assembly of a touch panel having a conductive film arranged on a surface of a substrate; an edge of the conductive film being connected to a silver conductive circuit; signals triggered on the conductive film being transferred to the silver conductive circuit and then to signal output ends at two sides of the silver conductive circuit to a succeeding processing circuit; the signal transfer assembly comprising:

a plurality of resistors arranged near an edge of the conductive film near the silver conductive circuit; the plurality of resistors being arranged as a row along the edge of the conductive film; each resistor being a slot penetrating through the conductive film; each area between every two adjacent slots being formed as a transfer channel so that there are a plurality of transfer channels and the resistors and the transfer channels are alternatively arranged along the edge of the conductive film; and wherein each resistor has an oblong rectangular shape and lengths of the resistors are longer at a middle portion of the edge of the conductive film and are shorter at two sides of the edge of the conductive film.

* * * * *